Patented May 21, 1935

2,001,791

UNITED STATES PATENT OFFICE 2,001,791

PROCESS FOR TREATING LATEX AND PRODUCT OBTAINED THEREBY

Chester E. Linscott, Saugus, Mass., assignor, by mesne assignments, to United States Rubber Company, New York, N. Y., a corporation of New Jersey No Drawing. Application October 20, 1933, Serial No. 694,521

11 Claims. (Cl. 18—50)

The present invention relates to processes for compounding latex and the products obtained thereby, and more particularly to stabilizing creamed latex in such a way that no water soluble substances will be left in a dried film of the same.

It has long since been known that concentrated latex substantially devoid of naturally occurring water soluble substances may be produced by creaming operations, such as mechanical creaming, commonly referred to as centrifuging, or by well-known chemical creaming operations, or both. Such concentrated latices have the very valuable property of greatly reduced water-soluble contents, repeated creaming operations, for example, producing a latex substantially devoid of the naturally occurring water-soluble substances. In the manufacture of various articles directly from such a latex, it is necessary to stabilize the same against mechanical operations and also against premature coagulation by virtue of the introduction into such a latex of various vulcanizing and/or other compounding ingredients necessary for producing a dried film having the desired characteristics. Heretofore in stabilizing such concentrated latices, various water-soluble ingredients have been added to the latex to increase its mechanical and chemical stability and hence water-soluble ingredients in some cases equally as objectionable as the naturally occurring water-soluble ingredients of the normal latex have been introduced into the concentrated dispersion. Where it is desired to produce a dried rubber article free from water-solubles directly from such an aqueous dispersion of rubber, it has been found necessary to wash the rubber article subsequent to manufacture. The disadvantage of such addition to creamed latex of water-soluble stabilizing materials, heretofore believed necessary, is well brought out in the article of F. Harriss Cotton on "Difficulties with latex" in the India Rubber World of March 1, 1933, vol. 87, No. 6, pages 31 and 32.

The present invention relates particularly to the stabilization of creamed latex, by which is meant the product of a creaming by centrifugation or by a chemical creaming operation, or both, so that the same may be compounded with the desired vulcanizing and/or other compounding ingredients and be stabilized against mechanical action such as spreading operations and the like, and yet be capable of production, on drying, of a rubber film substantially free of water-soluble ingredients.

According to the present invention there is added to a creamed latex to produce the desired resistance to mechanical action and other destabilizing influences, such as compounding, a soap of a volatile base and a soap-forming acid which on drying leaves only the water insoluble soap forming acid, together with a volatile resin solvent which is substantially a non-solvent of rubber. It has been found that these two materials provide the desired stability to a creamed latex for stabilization against the usual compounding operations and/or mechanical operations such as spreading and the like. It is substantially impossible either to add the common vulcanizing ingredients to a creamed latex or to spread a creamed latex by the usual spreading operations or to compound the latex with compounding ingredients and then spread the same, since in either the compounding operation or the spreading operation, incipient coagulation of the dispersed rubber particles will take place in the latex from which have been extracted in the creaming operation the naturally occurring stabilizing materials. By the present invention the creamed latex has been completely stabilized against compounding and mechanical operations, and the dried rubber film from such latex will be substantially free of water-soluble ingredients. The soap of a volatile base and a soap forming acid, commonly an ammonium soap of oleic acid, stearic acid, palmitic acid, lauric acid, or the like, is the primary stabilizing agent in the stabilization process of the present invention, of itself serves primarily to stabilize the latex composition prior to drying during compounding, mechanical operations, and the like. Such a soap, however, on heating, as in a drying operation, may become gelled upon partial evaporation of the water and tends to no longer act as a protective agent for the compounding ingredients, and further tends to produce a skin on top of the drying latex film thereby retarding further evaporation of the water from the interior of the latex film and resulting in non-homogeneity of the film. On complete drying, the water-soluble ammonium soap will decompose to leave only the soap-forming acid, which is insoluble in water, the volatile base such as ammonia having been driven off. The volatile resin solvent which is substantially a non-solvent of rubber is added to assist in the stabilization of the latex and acts more particularly in the present case as a secondary stabilizer to prevent gelling of the soap more particularly at elevated temperatures, so that the stabilizing function of the soap may continue to operate during the drying of the latex film, and result in a smooth dried film of rubber. The volatile resin solvent in addition to thus hastening the drying of the latex also materially assists in the wetting of surfaces as in fabric spreading operations and the like. The term "volatile resin solvent which is substantially a non-solvent of rubber" is used herein to refer more particularly to lower aliphatic and alicyclic ketones and monohydric alcohols. Such substances as methyl alcohol, ethyl alcohol, iso-propyl alcohol, butyl alcohol, iso-amyl alcohol, acetone, methyl ethyl ketone, cyclohexanol, methyl cyclohexanol, cyclohexanone, and the like, are examples of volatile lower aliphatic and alicyclic ketones and monohydric alcohols which may be utilized as secondary stabilizers together with ammonium soap in stabilizing the latex composition. Such ketones and alcohols are naturally volatile materials and leave no residue in a dried rubber film from a latex containing the same. The ammonium soap, and ketone and/or alcohol, may be added with the desired vulcanizing and/or other compounding ingredients or separately as desired. Part of the same may be added separately and part with the other compounding ingredients, for example, a portion of the stabilizing ingredients may be used in preparing an aqueous dispersion or paste of the remaining compounding ingredients, such dispersion or paste then being added to the creamed latex previously stabilized by the incorporation therein of the remainder of the stabilizing ingredients. Many of the vulcanizing ingredients commonly used are known to leave substantially no water soluble residue on drying and it is desirable of course that the vulcanizing ingredients and those other compounding ingredients that may be added to the latex should leave no water soluble ingredients in the dried rubber film.

As a specific illustration of one manner of carrying out the invention, but without intention to limit the invention except as required by the prior art, the following example is included:

To a twice creamed latex was added the major proportion of the ammonium soap and alicyclic alcohol used to stabilize the latex, and to the thus treated latex was subsequently added a paste of the desired vulcanizing ingredients which contained the remainder of the ammonium soap and alicyclic alcohol to be added. The addition of the above ingredients can best be illustrated in the following table in which parts are indicated by weight:

| | |
|---|---:|
| Rubber (from 60% latex) | 100 |
| Cyclohexanol | 1.2 |
| Oleic acid | 2.0 |
| Ammonium hydroxide | 3.0 |
| Water | 10 |
| Whiting | 5.0 |
| Sulphur | .75 |
| Zinc dimethyl dithiocarbamate (accelerator) | .5 |
| Benzothiazyl disulphide (accelerator) | .5 |
| Zinc oxide | .1 |
| p-(p-toluene sulphonylamino) phenyl p-tolylamine (antioxidant) | 1.0 |
| Cyclohexanol | .1 |
| Oleic acid | .1 |
| Ammonium hydroxide | .1 |
| Water | 6.0 |

In the above compound the ammonium soap of oleic acid is formed in situ but it is obvious that it may be previously prepared if desired. The cyclohexanol, water, and ammonium hydroxide pass off on drying, leaving the oleic acid. The result of such drying is a finished film substantially free of water-soluble material. The drying may of course be of sufficient temperature and duration to effect at least partial or incipient vulcanization of the rubber deposit or a subsequent vulcanizing operation may be made to take place. Various other compounding ingredients may be added as desired. For example, 1 part of Montan wax may be dispersed in 5 parts of water with the aid of .5 part of ammonia and the same added to the latex. On drying the ammonia would be volatilized and the water-insoluble wax would remain.

Various amounts of the soap, and ketone and/or alcohol may be added to the creamed latex depending on the compounding and use of the same. It has been found in general that about 1 to 10 parts of soap and about .5 to 10 parts of a resin solvent which is substantially a non-solvent of rubber per 100 parts of rubber solids of the latex are satisfactory, but it is not desired to be limited to such proportions since it is obvious under certain conditions greater or less amounts might be desirable. The latex may be utilized in any of the common operations for the manufacture of materials directly from aqueous dispersions of rubber such as spreading, dipping, coating, extrusion, or the like. If desired creamed prevulcanized latices may be treated according to the present invention in which case vulcanization of the manufactured article is unnecessary. Various fillers and other compounding ingredients may be added to a latex stabilized according to the present invention in the usual manner, generally in the form of pastes and the like as in the case of the vulcanizing ingredients added in the above example.

As various other modifications will occur to those skilled in the art, it is not intended to limit the invention other than as set forth in the appended claims.

Having thus described my invention, what I claim and desire to protect by Letters Patent is:

1. A stable concentrated latex composition capable of producing a dried rubber film substantially free of water-soluble ingredients comprising a creamed latex containing a soap of a volatile base and a soap-forming acid, and a volatile resin solvent which is substantially a non-solvent of rubber.

2. A stable concentrated latex composition capable of producing a dried rubber film substantially free of water-soluble ingredients comprising a creamed latex containing a soap of a volatile base and a soap-forming acid, and material from the group consisting of lower aliphatic and alicyclic ketones and monohydric alcohols.

3. A stable concentrated latex composition capable of producing a dried rubber film substantially free of water-soluble ingredients comprising a creamed latex containing an ammonium soap, and material from the group consisting of lower aliphatic and alicyclic ketones and monohydric alcohols.

4. A stable concentrated latex composition capable of producing a dried rubber film substantially free of water-soluble ingredients comprising a creamed latex containing vulcanizing ingredients which on drying leave substantially no water-soluble residue, an ammonium soap, and a volatile resin solvent which is substantially a non-solvent of rubber.

5. A stable concentrated latex composition capable of producing a dried rubber film substantially free of water-soluble ingredients comprising a creamed latex containing vulcanizing ingredients which on drying leave substantially no water-soluble residue, an ammonium soap, and material from the group consisting of lower aliphatic and alicyclic ketones and monohydric alcohols.

6. A stable concentrated latex composition capable of producing a dried rubber film substantially free of water-soluble ingredients comprising a creamed latex containing vulcanizing ingredients which on drying leave substantially no water-soluble residue, an ammonium soap, and cyclohexanol.

7. A method of stabilizing a creamed latex in such a way that no water-soluble substances will be left in a dried film of the same comprising adding to said latex a soap of a volatile base and a soap-forming acid, and a volatile resin solvent which is substantially a non-solvent of rubber.

8. A method of stabilizing a creamed latex in such a way that no water-soluble substances will be left in a dried film of the same comprising adding to said latex an ammonium soap and material from the group consisting of aliphatic and alicyclic ketones and monohydric alcohols.

9. A method of compounding a vulcanizable latex composition so as to produce a dried vulcanized rubber product substantially devoid of water-soluble ingredients comprising adding to a creamed latex vulcanizing ingredients which on drying leave substantially no water-soluble residue, a soap of a volatile base and a soap-forming acid, and a volatile resin solvent which is substantially a non-solvent of rubber.

10. A method of compounding a vulcanizable latex composition so as to produce a dried vulcanized rubber product substantially devoid of water-soluble ingredients comprising adding to a creamed latex vulcanizing ingredients which on drying leave substantially no water-soluble residue, an ammonium soap, and material from the group consisting of aliphatic and alicyclic ketones and monohydric alcohols.

11. A method of compounding a vulcanizable latex composition so as to produce a dried vulcanized rubber product substantially devoid of water-soluble ingredients comprising adding to a creamed latex vulcanizing ingredients which on drying leave substantially no water-soluble residue, an ammonium soap, and cyclohexanol.

CHESTER E. LINSCOTT.